United States Patent
Plachetta et al.

(10) Patent No.: US 9,200,115 B2
(45) Date of Patent: Dec. 1, 2015

(54) PROCESS FOR CONTINUOUSLY PREPARING COPOLYAMIDES FROM LACTAMS AND SALTS OF DIAMINES AND DICARBOXYLIC ACIDS

(75) Inventors: Christoph Plachetta, Limburgerhof (DE); Achim Gerstlauer, Limburgerhof (DE); Reinhard Lang, Neustadt (DE); Thomas Sauer, Dirmstein (DE); Jens Becker, Eisenberg (DE)

(73) Assignee: BASF SE, Ludwigshafen (DE)

( * ) Notice: Subject to any disclaimer, the term of this patent is extended or adjusted under 35 U.S.C. 154(b) by 95 days.

(21) Appl. No.: 13/139,133

(22) PCT Filed: Dec. 9, 2009

(86) PCT No.: PCT/EP2009/066692
§ 371 (c)(1),
(2), (4) Date: Jun. 10, 2011

(87) PCT Pub. No.: WO2010/066769
PCT Pub. Date: Jun. 17, 2010

(65) Prior Publication Data
US 2011/0245435 A1      Oct. 6, 2011

(30) Foreign Application Priority Data
Dec. 12, 2008  (EP) .................................... 08171542

(51) Int. Cl.
C08G 69/36   (2006.01)
C08L 77/00   (2006.01)
C08G 69/28   (2006.01)
C08G 69/08   (2006.01)

(52) U.S. Cl.
CPC .............. C08G 69/36 (2013.01); C08G 69/28 (2013.01); C08L 77/00 (2013.01); C08G 69/08 (2013.01)

(58) Field of Classification Search
CPC ......... C08L 77/00; C08G 69/08; C08G 69/36
See application file for complete search history.

(56) References Cited

U.S. PATENT DOCUMENTS

| | | | |
|---|---|---|---|
| 6,534,619 B1 * | 3/2003 | Elsner et al. | 528/72 |
| 6,703,475 B1 * | 3/2004 | Deininger et al. | 528/310 |
| 8,263,733 B2 * | 9/2012 | Weiss et al. | 528/310 |
| 2004/0102559 A1 * | 5/2004 | Oyamada et al. | 524/445 |
| 2010/0317810 A1 * | 12/2010 | Weiss et al. | 526/65 |
| 2011/0092645 A1 | 4/2011 | Loth | |

FOREIGN PATENT DOCUMENTS

| | | |
|---|---|---|
| DE | 110 507 | 12/1974 |
| DE | 25 01 348 | 7/1976 |
| DE | 199 23 439 | 11/2000 |
| EP | 0 393 546 | 10/1990 |
| EP | 1 007 582 | 3/1999 |
| EP | 1 113 848 | 2/2000 |
| EP | 1 173 264 | 11/2000 |
| EP | 1 667 051 | 6/2006 |
| FR | 2 914 308 | 10/2008 |
| WO | WO 95/01389 | 1/1995 |
| WO | WO 99/10408 | 3/1999 |
| WO | WO 00/07684 | 2/2000 |
| WO | WO 00/64554 | 11/2000 |
| WO | WO 2007/090768 | 8/2007 |
| WO | WO 2008/049786 | 3/2008 |
| WO | WO 2008/049786 | * 5/2008 |

* cited by examiner

*Primary Examiner* — Gregory Listvoyb
(74) *Attorney, Agent, or Firm* — Drinker Biddle & Reath LLP

(57) ABSTRACT

A process for continuously preparing copolyamides from lactams and salts of diamines and dicarboxylic acids, in which lactams together with salts of diamines and dicarboxylic acids are passed from the top downward through a vertical polymerization tube at polyamide-forming temperatures, which comprises a) intensively mixing an aqueous solution of lactams with salts of diamines and dicarboxylic acids under elevated pressure which is greater than the vapor pressure of the mixture which arises in a mixing apparatus at a temperature of from 80 to 300° C., b) feeding the mixture thus obtained to a heated helical tube evaporator in which a liquid phase and a vapor phase form at a temperature of from 140 to 300° C., a stream of water vapor and/or inert gas also being introduced into the mixture if appropriate upstream of the helical tube, c) removing the vapor phase formed in stage b) from the liquid phase and separating it in a column into water vapor and into organic components comprising diamines, dicarboxylic acids and lactams, and recycling the organic components into the polymerization, d) passing the liquid phase from the helical tube of stage b) mixed with the organic components of stage c) from the top downward through a vertical polymerization tube at polyamide-forming temperatures to obtain a copolyamide.

10 Claims, No Drawings

PROCESS FOR CONTINUOUSLY PREPARING COPOLYAMIDES FROM LACTAMS AND SALTS OF DIAMINES AND DICARBOXYLIC ACIDS

CROSS-REFERENCE TO RELATED APPLICATION

This application is a national stage application (under 35 U.S.C. §371) of PCT/EP2009/066692, filed Dec. 9, 2009, which claims benefit of European application 08171542.7, filed Dec. 12, 2008, the contents of each of which are incorporated herein by reference in their entireties.

FIELD OF THE INVENTION

Disclosed herein are processes for continuously preparing copolyamides from lactams and salts of diamines and dicarboxylic acids, in which lactams together with salts of diamines and dicarboxylic acids are passed from the top downward through a vertical polymerization tube at polyamide-forming temperatures.

BACKGROUND OF THE INVENTION

DD patent 110 507 discloses a process for preparing copolyamides from caprolactam and salts of diamines and dicarboxylic acids, e.g. AH salt, in which caprolactam, AH salt and water are supplied to a VK tube (vertical condensation tube) from the top, and the corresponding copolyamide is withdrawn at the lower section. The process has the disadvantage that diamine is also discharged with the vapors which escape at the top of the VK tube and is lost. The process also has the disadvantage that the water released with the AH salt solution supplied considerably impairs a precise temperature regime at the top of the VK tube.

Avoiding these disadvantages, EP-A-0 393 546 describes a continuous process for preparing copolyamides from caprolactam and salts of diamines and dicarboxylic acids, in which caprolactam together with polyamide-forming compounds formed from dicarboxylic acids and diamines is passed from the top downward through a vertical polymerization tube at polyamide-forming temperatures under elevated pressure and with simultaneous evaporation of water by means of a tubular preliminary condensation zone. This forms a vapor phase and a prepolymer at a temperature above the melting point of the prepolymer. The vapor phase is separated from the prepolymer melt and conducted into a column in which water vapor and an aqueous diamine solution are separated and the aqueous solution comprising diamines is recycled into the polymerization. Subsequently, the prepolymer melt is mixed with molten caprolactam, and the mixture of prepolymer and caprolactam is passed from the top downward through a vertical polymerization tube, in order thus to obtain a copolyamide.

The disadvantage of this process is that the prepolymer from the preliminary condensation zone already consists of blocks of low molecular weight condensed diamines and dicarboxylic acids, which also still remain as blocks in the subsequent polymerization with caprolactam. A better random distribution of the components does not take place. More salt formed from diamines and dicarboxylic acids is thus required in order to arrive at the desired copolymer melting point. In addition, copolymers thus prepared have a greater tendency to become discolored.

SUMMARY OF THE INVENTION

It is therefore an object of the present invention to provide a continuous process for preparing copolyamides from lactams (especially caprolactam) and salts of diamines and dicarboxylic acids, in which the random distribution of the monomer units is improved.

This object is achieved by a process for continuously preparing copolyamides from lactams and salts of diamines and dicarboxylic acids, in which lactams together with salts of diamines and dicarboxylic acids are passed from the top downward through a vertical polymerization tube at polyamide-forming temperatures, which comprises a) intensively mixing an aqueous solution of lactams with salts of diamines and dicarboxylic acids under elevated pressure which is greater than the vapor pressure of the mixture which arises in a mixing apparatus at a temperature of from 80 to 300° C., b) feeding the mixture thus obtained to a heated helical tube evaporator in which a liquid phase and a vapor phase form at a temperature of from 140 to 300° C., a stream of water vapor and/or inert gas also being introduced into the mixture if appropriate upstream of the helical tube, c) removing the vapor phase formed in stage b) from the liquid phase and separating it in a column into water vapor and into organic components comprising diamines, dicarboxylic acids and lactams, and recycling the organic components into the polymerization, d) passing the liquid phase from the helical tube of stage b) mixed with the organic components of stage c) from the top downward through a vertical polymerization tube at polyamide-forming temperatures to obtain a copolyamide.

The process according to the invention has the advantage that it provides copolyamides whose comonomer units are distributed significantly more randomly in the polymer chain than is possible by known processes. This allows the proportion of salts of diamines and dicarboxylic acids to be reduced compared to conventional processes. In addition, the novel process has the advantage that the copolyamides thus prepared are notable for improved product properties (for example lower intrinsic color).

BRIEF DESCRIPTION OF THE PREFERRED EMBODIMENTS

The use of helical tube evaporators in the preparation and workup of polymers is known per se. WO 2008/049786 describes the use of helical tube evaporators in the preparation of polyamides. The helical tube evaporators are used to concentrate aqueous extract solutions from the extraction of polyamides based on nylon-6.

EP-B-1 113 848 relates to processes for concentrating polymer solutions of thermoplastic polymers. In this process, polymer solutions with a polymer content of from 5 to 20% by weight are concentrated in a sequence of coiled tube evaporators with downstream tube bundle heat exchangers with a downstream separator.

EP-B-1 173 264 relates to a process and to an apparatus for concentrating polymer solutions of thermoplastic polymers. A polymer solution with a polymer content of from to 20% by weight is likewise concentrated in a sequence of coiled tube evaporators with a downstream separator and subsequent tube bundle heat exchanger with a downstream separator.

EP-B-1 007 582 relates to processes for preparing polyamide prepolymers in which a prepolymerization is performed in the presence of a flowing vapor phase.

According to the invention, the lactam components used are preferably those having from 6 to 12 ring members, for example valerolactam, caprolactam, enantholactam, capryllactam or lauryllactam, preferably caprolactam, and mixtures thereof.

According to the invention, the copolyamide components used are salts of preferably equimolar amounts of diamines and dicarboxylic acids in aqueous solution.

Preferred diamines have the formula I

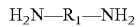

in which $R_1$ denotes an alkylene radical having from 4 to 16 carbon atoms, especially from 4 to 8 carbon atoms, which may have a cycloalkylene radical, or a 1,3- or 1,4-phenylene radical. Suitable compounds are, for example, 1,4-diaminobutane, hexamethylenediamine, octamethylenediamine, decamethylenediamine, or 1,3-phenylenediamine or 1,4-phenylenediamine. Particular industrial significance has been gained by diamines of the formula I in which $R_1$ denotes a straight-chain alkylene radical having from 4 to 8 carbon atoms. Particular industrial significance has been gained by hexamethylenediamine.

Preferred dicarboxylic acids have the formula II

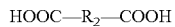

in which $R_2$ denotes an alkylene radical which has from 4 to 12 carbon atoms, especially from 4 to 8 carbon atoms, and may have a cycloalkylene radical, or is a 1,3- or 1,4-phenylene radical. Suitable dicarboxylic acids are, for example, adipic acid, azelaic acid, sebacic acid, suberic acid, dodecanedioic acid, or terephthalic acid or isophthalic acid. Particular preference is given to adipic acid, dodecanedioic acid, terephthalic acid and isophthalic acid. Particular industrial significance has been gained by salts of adipic acid/hexamethylenediamine, terephthalic acid/hexamethylenediamine and isophthalic acid/hexamethylenediamine, sebacic acid/hexamethylenediamine and dodecanedioic acid/hexamethylenediamine, or else mixtures of two or more of these salts.

In the process according to the invention, it is possible to use equimolar amounts of diamines and dicarboxylic acids. If desired, it is also possible to work with an excess of diamines or dicarboxylic acids. Frequently, a small excess of diamines is employed, since they are more volatile than the dicarboxylic acids, and losses of diamines can occur in the course of the process. The separation of the vapor phase downstream of the helical tube and recycling of the organic components into the polymerization allows, in accordance with the invention, monomer losses to be substantially prevented. This is why preference is given to working in an approximately stoichiometric range of diamines and dicarboxylic acids. Deviations of about 5%, preferably about 2.5%, especially about 1%, from stoichiometry are possible in accordance with the invention.

Preference is given to using diamines and dicarboxylic acids in equimolar amounts. The aqueous solutions used generally have a content of from 30 to 70% by weight, especially from 50 to 65% by weight, of the salts mentioned. Aqueous solutions generally have a pH of 7.7 at 20° C. Advantageously, the starting materials are aqueous solutions having a temperature of from 80 to 100° C.

Advantageously, in addition to the salts of diamines and dicarboxylic acids, lactam is used, especially caprolactam. It is also possible that an aqueous solution of (capro)lactam is used, which comprises, for example, from 60 to 90% by weight of (capro)lactam and has been obtained by extracting the copolyamide obtained with water and concentrating the aqueous extract, preferably with addition of from 0.5 to 2 times the amount of fresh lactam, based on extract lactam. A suitable solution is obtained, for example, by the process described in DE-A 25 01 348. The amount of salts of diamines and dicarboxylic acids is, based on the total amount of monomer, preferably from 0.2 to 40 mol %, more preferably from 0.5 to 20 mol %.

According to the invention, in stage a), an aqueous solution of lactams is mixed intensively with salts of diamines and dicarboxylic acids under elevated pressure which is greater than the vapor pressure of the mixture which arises, in a mixing apparatus at a temperature of from 80 to 300° C., preferably from 130 to 200° C. Preference is given to using equimolar amounts of diamines and dicarboxylic acids. "Elevated pressure" is understood to mean a pressure which is higher than the standard pressure and than the vapor pressure of the mixture which arises. Preference is given to working within a pressure range of from 2.5 to 50 bar, preferably from 5 to 20 bar. The mixing apparatus may be selected from any suitable mixing apparatuses, especially for liquids. These apparatuses are preferably continuous mixers, especially static mixers. The mixer internals can be selected such that very substantially homogeneous mixing takes place within a short time in the viscosity range of the monomer solutions.

"Intensive" mixing is understood to mean mixing which leads to substantial or complete homogenization of the aqueous starting monomer mixture.

According to the invention, an aqueous solution of salts of preferably equimolar amounts of diamines and dicarboxylic acids and lactam(s) is passed in stage (b) under elevated pressure with simultaneous evaporation of water through a helical tube evaporator to form a vapor phase and a liquid phase. The aqueous solution of salts of equimolar amounts of diamines and dicarboxylic acids and lactams is premixed, if appropriate in a static mixer, according to the desired copolymer composition, before it is introduced into the helical tube evaporator. The temperature in the preferably static mixer should be from 80 to 300° C., preferably from 130 to 200° C.

If appropriate, it is also possible for steam and/or inert gas to be introduced into the mixture upstream of the helical tube. Inert gas is, for example, nitrogen, carbon dioxide or argon.

The helical tube evaporator is preferably a jacketed tube in which a heating medium is conducted within the heating jacket and serves for temperature control. Industrial jacketed tubes which are used with preference in accordance with the invention have a length in the range from 20 to 100 m, more preferably from 40 to 80 m, while having an internal diameter of preferably from 10 to 150 mm, especially from 15 to 60 mm. The helical tube evaporator causes evaporation of water in the inventive aqueous solution of salts of equimolar amounts of diamines and dicarboxylic acids and lactams, resulting in an expansion in volume. Typically, in the downstream region of the helical tube evaporator, there is a core flow of gas (water vapor), whereas a wall film is present as a liquid phase. If required, at the inlet or "top" of the helical tube, an inert gas can be metered in, for example steam, $N_2$, Ar, $CO_2$ or gas mixtures comprising them, for example 16 bar steam, in order to generate or to enhance the core flow. This may be required, for example, when insufficient water is present in the aqueous solution of salts of diamines and equivalent amounts of dicarboxylic acid and caprolactam, for example at total concentrations of the organic components above 98%. The gas added then serves as a carrier gas. At the end of the helical tube reactor, there is typically a phase separation between vapor phase and liquid phase. The core flow of the gas may, for example, based on the cross-sectional area of the helical tube, make up an areal proportion of from 15 to 35%, especially about 25%, while the wall film, i.e. the liquid phase, may make up from 65 to 85%, especially about 75%, of the cross-sectional area. In the process according to the invention, the helical tube evaporator may serve as a valve, since a high pressure, for example from 5 to 20 bar, is present at the evaporator inlet, while the pressure is about atmospheric at the outlet of the reactor. The pressure is thus reduced continuously over the length of the helical tube. The helical tube evaporator may be constructed as described in WO 2008/049786.

As the reaction mixture passes through the helical tube evaporator, a temperature of from 140 to 300° C., preferably from 160 to 200° C., advantageously from 175 to 195° C., is established. At the same time, a pressure reduction to preferably about atmospheric pressure (1 bar), and a removal of a gaseous phase to obtain the liquid phase, take place. The decompression of the reaction mixture to about atmospheric pressure is thus effected by, passage through the helical tube. The gaseous phase comprises predominantly steam, which is separated from the organic constituents after passage out of the helical tube evaporator. The vapor phase can be removed, for example, by means of a column, in which case the column can be purged with water.

The expression "about atmospheric pressure" describes atmospheric pressure (1 bar) with deviations of from −0.5 to +1 bar, especially ±0.5 bar.

For an advantageous mode of operation of the helical tube, the residence times are preferably in the range from 40 to 120 seconds. When greater residence times of from 3 to 10 minutes are employed, the helical tube evaporator is advantageously provided with internals, such as random packings, Raschig rings or Pall rings, especially wire mesh rings, in order to achieve a large surface area.

Preferably, no chemical reaction, for instance polymerization, takes place in the helical tube evaporator, but rather only a separation into vapor/gas phase and liquid phase occurs. Preference is given to removing water from the mixture in vaporous form.

The biphasic mixture of vapor phase and liquid phase which exits from the helical tube, consisting of salts of equimolar amounts of diamines and dicarboxylic acids and lactams, or comprising them, is subsequently separated. The separation generally proceeds of its own accord on the basis of the physical differences in a vessel. Advantageously, the biphasic mixture of vapor phase and liquid phase is passed into the vapor space at the top of the tubular polymerization zone of the vertical polymerization tube (VK tube), and the separation is performed there.

The vapor phase obtained is advantageously separated in a column into steam, diamine, dicarboxylic acid and caprolactam, and all organic components are recycled into the polymerization, preferably into stage d). The vapor phase is advantageously separated in a column with rectification. Suitable columns are, for example, columns with random packing, columns with structured packing, or bubble-cap tray, valve tray or sieve tray columns, with from 5 to 15 theoretical plates. The column is appropriately operated under conditions identical to those in the separation of vapor phase and liquid phase, for example from 0.5 to 2.5 bar absolute, or under the pressure of the polymerization zone. Advantageously, from 0.1 to 0.5 l of water per kg of steam is introduced at the top of the column, in order to improve the separation effect. The column efflux obtained is a liquid phase comprising or consisting of diamines, dicarboxylic acids and lactams. Steam is obtained at the top of the column.

If, in the preferred mode of operation, the separation is carried out in the top of the VK tube; the liquid phase comprising or consisting of diamines, dicarboxylic acids and lactams is returned to the top of the VK tube.

The organic phase from the helical tube, comprising or consisting of salts of diamines and (approximately) equivalent amounts of dicarboxylic acids and lactams, and the reflux from the separating column, are preferably mixed by stirring in the top of the vertical polymerization tube (VK tube).

Subsequently, the mixture from the top of the VK tube is passed from the top downward through a vertical polymerization tube (VK tube) at polyamide-forming temperatures, and a copolyamide is obtained. In the upper third of the polymerization tube, a temperature of preferably from 250 to 285° C., especially from 255 to 275° C., is generally maintained. Over the course of the polymerization tube, the temperature of the melt is controlled such that a melt at preferably from 240 to 260° C. is obtained at the lower end. The residence time in the polymerization tube is preferably from 8 to 24 hours. The copolyamide thus obtained preferably has a relative viscosity of from 2.0 to 3.0 and a content of water extractables of from 3.5 to 12% by weight, especially from 5 to 11% by weight. The copolyamide melt thus obtained is generally cast into extrudates, solidified and granulated, or granulated directly by means of underwater granulation in a flowing water stream. Suitable processes are known to those skilled in the art.

The granule thus obtained can then be extracted continuously in countercurrent with water at a temperature of preferably from 80 to 120° C. The aqueous extract thus obtained is then advantageously concentrated after addition of from 0.5 to 2 times the amount of fresh caprolactam, based on extract caprolactam. An example of a suitable process is described in DE-A 25 01 348.

In general, the extracted copolyamide is subsequently dried. Advantageously, this involves heating it using inert gases such as nitrogen or superheated steam as a heat carrier in countercurrent up to the desired viscosity, for example at a temperature of from 150 to 185° C.

Copolyamides obtainable by the process of the invention generally have from 60 to 99% by weight, especially from 70 to 98% by weight, of nylon-6 units and are suitable for producing moldings by injection molding or extrusion, and also for producing threads, fibers and films.

The invention is illustrated in detail hereinafter with reference to examples.

EXAMPLES

Example 1

Copolyamides composed of nylon-6 and nylon-6,6 units are prepared in a process sequence proceeding from 62% by weight aqueous AH salt solution and caprolactam. The AH salt solution is heated to 95° C. and mixed with the caprolactam, which has been heated separately to 200° C., in a static mixer. The mixture is conducted at a pressure of about 9 bar and a temperature of about 180° C. through a pressure control valve into a helical tube evaporator. At the same time, steam is metered in at the inlet of the helical tube evaporator. The pressure at the inlet of the helical tube evaporator is about 5 bar. The steam is introduced to introduce energy into the monomer mixture and in order to blow the mixture through the downstream helical tube. The helical tube evaporator is a jacketed tube in which a heating medium is conducted within the heating jacket and serves for temperature control. The length is in the range from 20 to 100 m, and the internal diameter is preferably from 15 to 60 mm. The evaporator tube is arranged in the form of a screw or helix. The helical tube evaporator causes evaporation of water in the aqueous mixture, resulting in an expansion in volume. At the same time, the pressure is reduced continuously over the helical tube evaporator. High flow rates are present in the helical tube evaporator, since a large amount of steam forms. The formation of a large amount of steam leads to very short residence times and to self-cleaning of the helical tube. The mixture which leaves the helical tube evaporator at a temperature of 195° C. at about atmospheric pressure is fed to the top of a VK tube. At the top of the VK tube, the temperature is about 258° C. The vapor phase is removed at the top of the VK tube by means of a column and discharged after condensation. The monomer mixture which remains passes through the VK tube, which is heated in segments, the temperature decreasing from the outlet of the VK tube in stages via the temperatures of 265° C. and about 270° C. to about 250° C. at the outlet of the VK tube. The VK tube is operated at the hydrostatic system pressure which is established. At the outlet of the VK tube, a nylon-6/6,6 melt is obtained, which is fed by means of a discharge pump directly to an extrudate granulation or underwater granulation with a subsequent extraction stage and again subsequent drying. The drying is followed by a postcondensation.

The residence time in the helical tube evaporator is in the range of minutes, while the residence time in the VK tube is about 12 hours.

There is no reaction in the static mixer and in the helical tube. The reaction to give the polyimide does not take place until within the VK tube.

Compared to customary evaporators such as tube bundle evaporators, the helical tube evaporator allows gentler mixing and water evaporation at low temperature, such that the thermal stress on the monomer mixture is reduced.

Based on the total monomers, 20% by weight of AH salt or less is used. One advantage of the process is to obtain, with a smaller proportion of nylon-6,6, the same melting point as for a copolyamide prepared by customary processes, as described, for example, in EP-A-0 393 546, and less yellowing additionally occurs. The decrease in the melting point at the same nylon-6,6 content and the reduction in yellowing are attributed to better random distribution of the nylon-6,6 units in the copolyamide.

Example 2

In various production and test lines, nylon-6/6,6 copolymers with different relative viscosities were prepared. The pressure in the helical tube was 5 bar and the temperature 195° C. The residence time was about one minute. The polymerization in the VK tube was performed at a temperature of from 240 to 290° C., a pressure of 300 mbar and a residence time of 12 hours. For comparison, the operating parameters described in EP-A-0 393 546 were used. The amino end groups and carboxyl end groups (AEG and CEG) were determined by the method described in WO 95/01389, page 6 line 35 to page 7 line 40. The relative viscosity (RV) was determined at a temperature of 25° C. and a concentration of 1 g of polymer per 100 ml in 96% by weight sulfuric acid.

Table 1 which follows reports the compositions and the properties of the products. The comparison is of nylon-6/6,6 copolymers with a relative viscosity of RV=3.3 and RV=4.0, which have been prepared by the inventive technology and by the known technology (see EP 393 546). For a relative viscosity of RV=3.3, the nylon-6,6 content was adjusted so as to give rise to a melting point of 196° C. for both technologies. For a relative viscosity of RV=4.0, the nylon-6,6 content in the case of the known technology was adjusted so as to result in a melting point of 192° C. For the inventive technology, the nylon-6,6 content was adjusted so as to result in a melting point of 189° C. For the known technology, this is achievable only by means of very high nylon-6,6 contents of >20% by weight.

TABLE 1

Summary of the properties of the nylon-6/6,6 copolymers prepared

| Nylon-6/6,6 copolymer | Relative viscosity [–] | Melting point [° C.] | Nylon-6,6 content [% by wt.] | AEG [mmol/kg] | Apha number [–] | $Tk_{max}$ [° C.] |
|---|---|---|---|---|---|---|
| Inventive | 3.3 | 196 | 13.5-14.5 | 45.0-47.0 | 4-7 | 121-122 |
| Comparative | 3.3 | 196 | 17.0-18.0 | ≈48 | 7-10 | 122 |
| Inventive | 4.0 | 189 | 17.5-18.5 | 36.5-38.5 | 6-8 | 118 |
| Comparative | 4.0 | 192 | 18.5-19.5 | ≈40 | 8-10 | 118-128 |

Table 1 shows that nylon-6/6,6 copolymers prepared by the inventive technology with a relative viscosity of RV=3.3 require a significantly lower nylon-6,6 content in order to achieve a melting point of 196° C. within the melting point depression of the nylon-6.

For a viscosity of RV=4.0, it becomes clear that nylon-6/6,6 copolymers prepared by the inventive technology, at a comparable nylon-6,6 content, have a significantly lower melting point of 189° C. compared to 192° C.

The intrinsic color (alpha values) for both viscosities considered shows lower values and hence further advantages for the inventive technology. The remaining product properties of the copolymers, for example the amino end groups or the temperature maximum of the crystallization peak (from DSC analysis), are comparable. These improved product properties of the nylon-6/6,6 copolymers lead to improvements in the course of further processing, for example more transparent films in film production.

In order to better understand the improved properties of the nylon-6/6,6 copolymers prepared by the inventive technology, the $^{13}C$ NMR analyses shown in Table 2 below were carried out.

TABLE 2

$^{13}C$ NMR analyses of the nylon-6/6,6 copolymers prepared.

| Nylon-6/6,6 copolymer | CPL | Nylon-6,6 content [% by wt.] | CPL-CPL bond [mol %] | CPL-HMD bond [mol %] | ADA-CPL bond [mol %] | ADA-HMD bond [mol %] |
|---|---|---|---|---|---|---|
| Inventive | 3.3 | 13.5-14.5 | 80.0 | 9.6 | 9.6 | 0.8 |
| Comparative | 3.3 | 17.0-18.0 | 76.5 | 10.1 | 10.2 | 3.2 |
| Inventive | 4.0 | 17.5-18.5 | 68.8 | 14.0 | 14.0 | 3.2 |
| Comparative | 4.0 | 18.5-19.5 | 70.4 | 12.3 | 12.3 | 5.0 |

Nomenclature: CPL = caprolactam
HMD = hexamethylenediamine
ADA = adipic acid

The $^{13}$C NMR analyses show the proportion of individual chemical bonds in the polymer chain. Of particular interest is the occurrence of direct chemical bonds between adipic acid (ADA) and hexamethylenediamine (HMD), which indicates the existence of nylon-6,6 block structures in the polymer chain.

Table 2 shows that nylon-6/6,6 copolymers prepared by the inventive technology with a relative viscosity of RV=3.3 have a significantly lower content of nylon-6,6 block structures (0.8 mol % compared to 3.2 mol %). This indicates the above-described advantages of the novel process compared to the process described in EP 393 546.

For a viscosity of RV=4.0, it becomes clear that nylon-6/6,6 copolymers prepared by the inventive technology, at 3.2 mol % compared to 5 mol %, likewise have a significantly lower content of nylon-6,6 block structures. The advantages of the process according to the invention are thus independent of the viscosity of the end polymer.

The invention claimed is:

1. A process for continuously preparing copolyamides from lactams and salts of diamines and dicarboxylic acids, in which the lactams together with the salts of diamines and dicarboxylic acids are passed from the top downward through a vertical polymerization tube at polyamide-forming temperatures, which comprises
   a) intensively mixing an aqueous solution of lactams with salts of diamines and dicarboxylic acids under elevated pressure which is greater than the vapor pressure of the mixture which arises in a mixing apparatus at a temperature of from 80 to 300° C., wherein the intensive mixing leads to substantial or complete homogenization of the aqueous starting monomer mixture,
   b) feeding the mixture thus obtained to a heated helical tube evaporator in which a liquid phase and a vapor phase form at a temperature of from 140 to 300° C., a stream of water vapor and/or inert gas also being introduced into the mixture if appropriate upstream of the helical tube, and a decompression to about atmospheric pressure is effected by passage through the helical tube evaporator, wherein no polymerization takes place in the helical tube evaporator,
   c) removing the vapor phase formed in stage b) from the liquid phase and separating it in a column into water vapor and into organic components comprising diamines, dicarboxylic acids and lactams, and recycling the organic components into the polymerization in stage d),
   d) passing the liquid phase from the helical tube of stage b) mixed with the organic components of stage c) from the top downward through a vertical polymerization tube at polyamide-forming temperatures to obtain a copolyamide,
   wherein the vapor phase which forms from the mixture as it flows through the helical tube is separated from the liquid phase in the top of the vertical polymerization tube and the vapor phase from the top of the polymerization tube is separated in a column into water vapor and into an organic phase comprising diamines, dicarboxylic acids and lactams, and the organic phase is recycled into the top of the vertical polymerization tube.

2. The process according to claim 1, wherein aqueous solutions of equimolar amounts of diamines of the formula I

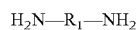

in which $R_1$ denotes an alkylene radical which has from 4 to 16 carbon atoms and may have a cycloalkylene radical, or a 1,3- or 1,4-phenylene radical, and dicarboxylic acids of the formula II

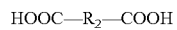

in which $R_2$ denotes an alkylene radical having from 4 to 12 carbon atoms or a 1,3- or 1,4-phenylene radical, are used.

3. The process according to claim 1, wherein the lactams used are those having from 6 to 12 ring members.

4. The process according to claim 3, wherein the lactam used is caprolactam.

5. The process according to claim 1, wherein lactam which has been obtained by extracting the copolyamide with water and subsequently concentrating the aqueous extract with addition of fresh lactam is additionally used in stage a).

6. The process according to claim 1, wherein a temperature of from 130 to 200° C. is maintained in stage (a).

7. The process according to claim 1, wherein a pressure of from 5 to 20 bar is maintained in stage (a).

8. The process according to claim 1, wherein the temperature in the helical tube evaporator is from 160 to 300° C.

9. The process according to claim 1, wherein the amount of salts of diamines and dicarboxylic acids, based on the total amount of monomers, is from 0.2 to 40 mol %.

10. A copolyamide having 70 to 98% by weight of polyamide-6 units, obtainable by a process according to claim 1, wherein the lactam is caprolactam and the salts of diamines and dicarboxylic acids are salts of adipic acid/hexamethylene diamine.

* * * * *